US009373835B2

(12) United States Patent
Guyomard et al.

(10) Patent No.: US 9,373,835 B2
(45) Date of Patent: Jun. 21, 2016

(54) METHOD FOR THE PREPARATION OF $LI_{1+\alpha}V_3O_8$

(71) Applicants: Dominique Guyomard, Sautron (FR); Joel Gaubicher, Nantes (FR); Marc Deschamps, Quimper (FR); Matthieu Dubarry, Nantes (FR); Benoit Morel, Champagne Mouton (FR)

(72) Inventors: Dominique Guyomard, Sautron (FR); Joel Gaubicher, Nantes (FR); Marc Deschamps, Quimper (FR); Matthieu Dubarry, Nantes (FR); Benoit Morel, Champagne Mouton (FR)

(73) Assignees: BATSCAP, Odet Ergue-Gaberic (FR); CENTRE NATIONAL DE LA RECHERCHE SCIENTIFIQUE, Paris (FR)

(*) Notice: Subject to any disclaimer, the term of this patent is extended or adjusted under 35 U.S.C. 154(b) by 413 days.

(21) Appl. No.: 13/857,832

(22) Filed: Apr. 5, 2013

(65) Prior Publication Data
US 2013/0216917 A1 Aug. 22, 2013

Related U.S. Application Data

(62) Division of application No. 11/665,932, filed as application No. PCT/FR2005/002580 on Oct. 18, 2005, now Pat. No. 8,435,484.

(30) Foreign Application Priority Data

Oct. 22, 2004 (FR) ...................................... 04 11310

(51) Int. Cl.
*H01M 4/131* (2010.01)
*C01G 31/00* (2006.01)
(Continued)

(52) U.S. Cl.
CPC ............... *H01M 4/131* (2013.01); *C01G 31/00* (2013.01); *H01M 4/136* (2013.01); *H01M 4/485* (2013.01);
(Continued)

(58) Field of Classification Search
CPC ..... H01M 4/131; H01M 4/136; H01M 4/485; H01M 4/5825; H01M 4/62; H01M 10/0525; C01G 31/00
USPC ............... 429/320, 322, 188, 199, 213.2, 217
See application file for complete search history.

(56) References Cited

U.S. PATENT DOCUMENTS

| 5,512,214 | A  |   | 4/1996 | Koksbang |
|---|---|---|---|---|
| 7,744,835 | B2 |   | 6/2010 | Guyomard et al. |
| 2005/0026041 | A1 | * | 2/2005 | Jouanneau ............ H01M 4/131 429/231.1 |
| 2006/0039851 | A1 |   | 2/2006 | Harabasz et al. |

FOREIGN PATENT DOCUMENTS

WO  2004024631 A1  3/2004

OTHER PUBLICATIONS

Jinggang Xie et al., "Low-Temperature Sol-Gel Synthesis of Li1.2V3O8 from V2O5 Gel", Materials Letters, vol. 57, No. 18, 2003, pp. 2682-2687.

(Continued)

Primary Examiner — Karie O'Neill Apicella
(74) Attorney, Agent, or Firm — Sofer & Haroun, LLP

(57) ABSTRACT

The invention relates to a lithium vanadium oxide which corresponds to the formula $Li_{1+\alpha}V_3O_8$ ($0.1 \leq \alpha \leq 0.25$). It is composed of agglomerates of small needles having a length l from 400 to 1000 nm, a width w such that $10 < l/w < 100$ and a thickness t such that $10 < l/t < 100$. It is obtained by a process consisting in preparing a precursor gel by bringing $\alpha$-$V_2O_5$ and a Li precursor into contact in amounts such that the ratio of the concentrations $[V_2O_5]/[Li]$ is between 1.15 and 1.5 and in subjecting the gel to a heat treatment comprising a first stage at 80° C.-150° C. for 3 h to 15 days and a second stage between 250° C. and 350° C. for 4 min to 1 hour, under a nitrogen or argon atmosphere. It is useful as an active material of a positive electrode.

20 Claims, 2 Drawing Sheets

(51) Int. Cl.
*H01M 4/136* (2010.01)
*H01M 4/485* (2010.01)
*H01M 4/58* (2010.01)
*H01M 4/62* (2006.01)
*H01M 10/0525* (2010.01)

(52) U.S. Cl.
CPC .............. *H01M 4/5825* (2013.01); *H01M 4/62* (2013.01); *H01M 10/0525* (2013.01); *Y02E 60/122* (2013.01)

(56) References Cited

OTHER PUBLICATIONS

Severine Jouanneau et al., "Influence of the Morphology on the Li Insertion Properties of Li1.1V3O8", Journal of Materials Chemistry, vol. 13, 2003, pp. 921-927.
International Search Report dated Mar. 8, 2006.

* cited by examiner

METHOD FOR THE PREPARATION OF $LI_{1+\alpha}V_3O_8$

The present application is a divisional of U.S. patent application Ser. No. 11/665,932, filed 25 Jan. 2010, which is a 371 application of PCT/FR2005/002580, filed 18 Oct. 2005, which claims priority to French Application No. 04/11310, filed 22 Oct. 2004, the contents of all of which are hereby incorporated by reference in their entirety.

BACKGROUND OF THE INVENTION

The present invention relates to a process for the preparation of a lithium vanadium oxide, to the compound obtained and to its use as active material of a positive electrode.

Batteries comprising a positive electrode and a negative electrode separated by an electrolyte comprising a lithium salt in solution in a solvent are widely known. The operation of these batteries is provided by the reversible circulation of lithium ions in the electrolyte between the electrodes. The positive electrode is generally composed of a composite material comprising an active material, a binder, a material conferring electron conduction and optionally a compound conferring ionic conduction. The compound conferring electron conduction can be a carbon black which does not catalyze the oxidation of the electrolyte at a high potential.

The use is known of lithium vanadium oxides $Li_{1+\alpha}V_3O_8$ ($0.1 \leq \alpha \leq 0.25$) as positive electrode active material. Various processes for the preparation of these compounds are known. A particularly advantageous process consists in preparing a precursor gel of the mixed oxide, in drying the gel and in then subjecting it to a heat treatment. Thus, S. Jouanneau et al. [J. Mater. Chem., 2003, 13, 921-927] describe a process which consists in preparing a gel by adding $V_2O_5$ to an aqueous $LiOH.H_2O$ solution, in drying the gel obtained after maturing at 50° C. with stirring for 24 hours and in then subjecting the xerogel obtained to a heat treatment at 350° C. or at 650° C. for 10 hours. The disadvantage of this process is that it employs a heat treatment over a long period of time, the energy thus required significantly increasing the production cost.

The present inventors have now found that an oxide $Li_{1+\alpha}V_3O_8$ having properties at least equivalent to those of the oxide of the above prior art can be obtained by a similar process in which the heat treatment is carried out for a time ranging from a few minutes to 1 hour.

The aim of the present invention is to provide a simple and inexpensive process for the preparation of an oxide $Li_{1+\alpha}V_3O_8$ ($0 \leq \alpha \leq 0.25$).

SUMMARY OF THE INVENTION

The process according to the present invention consists in preparing a precursor gel and in subjecting said gel to a heat treatment. It is characterized in that:
the precursor gel is prepared by bringing $\alpha$-$V_2O_5$ and a Li precursor into contact in amounts such that the ratio of the [$V_2O_5$]/[Li] concentrations is between 1.15 and 1.5;
the heat treatment is carried out in two stages: a first stage at a temperature of between 80° C. and 150° C. for a time of 3 hours to 15 days and a second stage at a temperature of between 250° C. and 350° C. for a time of between 4 min and 1 hour, under air or under a nitrogen or argon atmosphere.

DETAILED DESCRIPTION OF THE PREFERRED EMBODIMENTS

Figure 1:
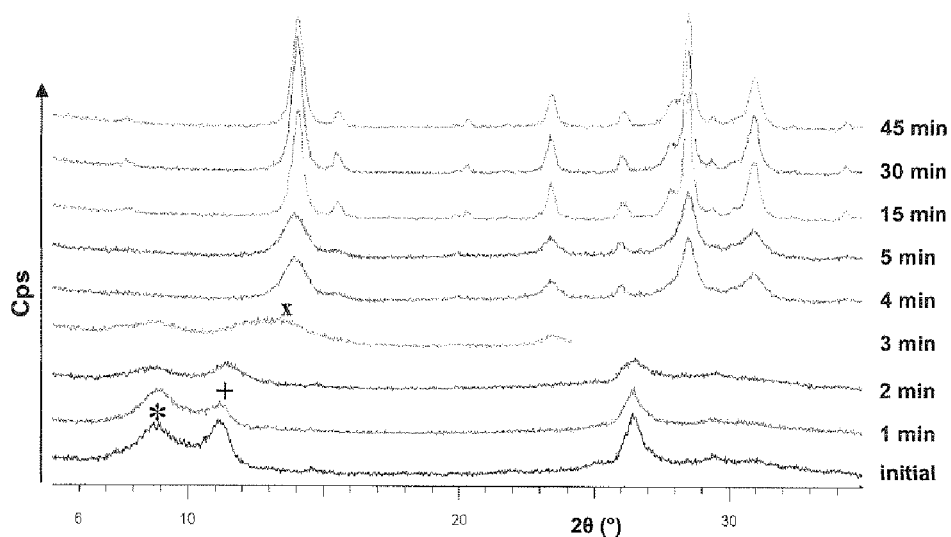
FIG. 1 represents the X-ray diffraction diagram for the various samples obtained and for the initial sample before heat treatment at 350° C.

In a first embodiment, the Li precursor is $LiOH.H_2O$. $\alpha$-$V_2O_5$ and $LiOH.H_2O$ are introduced into the water under a nitrogen atmosphere and the gel is formed in approximately 15 h. The concentrations of precursors can vary between 0.75 mol/l and 3 mol/l for $\alpha$-$V_2O_5$ and between 0.55 mol/l and 2.2 mol/l for $LiOH.H_2O$.

In a second embodiment, an aqueous solution comprising from 10 to 50% by volume of hydrogen peroxide is added to the reaction medium. The gel is then formed in a few minutes. The limiting concentrations which can be used are from 0.05 mol/l to 2 mol/l for $\alpha$-$V_2O_5$ and from 0.04 mol/l to 1.5 mol/l for the Li precursor.

In the second embodiment:
the lithium precursor can be chosen from $LiOH.H_2O$, LiCl, $LiNO_3$ or a lithium salt of a carboxylic acid, for example chosen from lithium acetylacetonate, lithium acetate, lithium stearate, lithium formate, lithium oxalate, lithium citrate, lithium lactate, lithium tartrate or lithium pyruvate;
$\alpha$-$V_2O_5$ is brought into contact with an aqueous peroxide solution in the presence of a lithium precursor. The gel is observed to start forming after a few minutes. The gel is completely formed after maturing for 15 min.
the respective amounts of Li precursor and of $\alpha$-$V_2O_5$ in the reaction medium are preferably such that 0.08 mol·l$^{-1}$<[Li]<0.7 mol·l$^{-1}$; 0.1 mol·l$^{-1}$<[$V_2O_5$]<1 mol·l$^{-1}$. Excessively high concentrations of reactants can bring about effervescence, while excessively low concentrations give precipitates and not gels.

The material obtained by the process of the invention is an oxide $Li_{1+\alpha}V_3O_8$ ($0.1 \leq \alpha \leq 0.25$) composed of agglomerates of small needles, said needles having a length l from 400 to 1000 nm, a width w such that 10<l/w<100 and a thickness t such that 10<l/t<100.

A material according to the present invention can be used for the preparation of a composite positive electrode for a lithium battery.

In a particular embodiment, a positive electrode according to the present invention is composed of a composite material which comprises:
an oxide $Li_{1+\alpha}V_3O_8$ obtained by the process of the present invention,
a binder conferring mechanical strength,
a compound conferring electron conduction,
optionally a compound conferring ionic conduction.

The content of oxide $Li_{1+\alpha}V_3O_8$ is preferably between 80 and 90% by weight. The content of binder is preferably less than 10% by weight. The content of compound conferring electron conduction is preferably between 5 and 15% by weight. The content of compound conferring ionic conduction is preferably less than 5% by weight.

The binder can be composed of a nonsolvating polymer, of a solvating polymer or of a mixture of solvating polymer and of nonsolvating polymer. It can additionally comprise one or more liquid polar aprotic compounds. The nonsolvating polymer can be chosen from vinylidene fluoride homopolymers and copolymers, copolymers of ethylene, of propylene and of diene, tetrafluoroethylene homopolymers and copolymers, N-vinylpyrrolidone homopolymers and copolymers, acrylonitrile homopolymers and copolymers, and methacrylonitrile homopolymers and copolymers. Poly(vinylidene fluoride) is particularly preferred. The nonsolvating polymer can carry ionic functional groups. Mention may be made, as examples of such a polymer, of polyperfluoroether sulfonate salts, some of which are sold under the name Nafion®, and polystyrene sulfonate salts.

The solvating polymer can be chosen, for example, from polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin; and networks obtained by polycondensation and carrying groups which make possible the incorporation of crosslinkable groups.

The polar aprotic compound can be chosen from linear or cyclic carbonates, linear or cyclic ethers, linear or cyclic esters, linear or cyclic sulfones, sulfamides and nitriles.

The compound conferring electron conduction can be chosen, for example, from carbon blacks, graphites, carbon fibers, carbon nanowires or carbon nanotubes.

The compound conferring ionic conduction is a lithium salt advantageously chosen from $LiClO_4$, $LiPF_6$, $LiAsF_6$, $LiBF_4$, $LiR_FSO_3$, $LiCH_3SO_3$, lithium bisperfluoroalkylsulfonimides or lithium bis- or trisperfluorosulfonylmethides.

A composite positive electrode according to the invention can be prepared by mixing the oxide $Li_{1+\alpha}V_3O_8$, a binder in an appropriate solvent, a material conferring electron conduction, and optionally a lithium salt, by spreading the mixture obtained over a metal disk acting as collector (for example an aluminum disk) and by then evaporating the solvent under hot conditions under a nitrogen atmosphere. The solvent is chosen according to the binder used. In addition, a positive electrode can be prepared by extrusion of a mixture of its constituents.

An electrode thus constituted can be used in a battery comprising a positive electrode and a negative electrode separated by an electrolyte comprising a lithium salt in solution in a solvent. The operation of such a battery is provided by the reversible circulation of lithium ions in the electrolyte between the electrodes. One of the subject matters of the present invention is a battery in which the electrolyte comprises a lithium salt in solution in a solvent, characterized in that it comprises a positive electrode comprising, as active material, the oxide $Li_{1+\alpha}V_3O_8$ prepared according to the process of the present invention. When a positive electrode comprising the oxide $Li_{1+\alpha}V_3O_8$ as obtained by the process of the invention is fitted into a battery, the battery thus formed is found in the charged state.

In a battery according to the invention, the electrolyte comprises at least one lithium salt in solution in a solvent. Mention may be made, as examples of salts, of $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$, $R_F$ representing a perfluoroalkyl group having from 1 to 8 carbon atoms or a fluorine atom.

The solvent of the electrolyte can be composed of one or more polar aprotic compounds chosen from linear or cyclic carbonates, linear or cyclic ethers, linear or cyclic esters, linear or cyclic sulfones, sulfamides and nitriles. The solvent is preferably composed of at least two carbonates chosen from ethylene carbonate, propylene carbonate, dimethyl carbonate, diethyl carbonate and ethyl methyl carbonate. A battery having a polar aprotic solvent electrolyte generally operates in a temperature range from −20° C. to 60° C.

The solvent of the electrolyte can additionally be a solvating polymer. Mention may be made, as examples of solvating polymers, of polyethers of linear, comb or block structure, which may or may not form a network, based on poly(ethylene oxide); copolymers comprising the ethylene oxide or propylene oxide or allyl glycidyl ether unit; polyphosphazenes; crosslinked networks based on polyethylene glycol crosslinked by isocyanates; copolymers of oxyethylene and of epichlorohydrin as disclosed in FR-2 770 034; and networks obtained by polycondensation and carrying groups which make possible the incorporation of crosslinkable groups. Mention may also be made of block copolymers in which some blocks carry functional groups which have redox properties. A battery having a polymeric solvent electrolyte generally operates in a temperature range from 60° C. to 120° C.

In addition, the solvent of the electrolyte can be a mixture of a liquid polar aprotic compound chosen from the polar aprotic compounds mentioned above and of a solvating polymer. It can comprise from 2 to 98% by volume of liquid solvent, depending on whether a plasticized electrolyte with a low content of polar aprotic compound or a gelled electrolyte with a high content of polar aprotic compound is desired. When the polymeric solvent of the electrolyte carries ionic functional groups, the lithium salt is optional.

The solvent of the electrolyte can also be a mixture of a polar aprotic compound as defined above or of a solvating polymer as defined above and of a nonsolvating polar polymer comprising units comprising at least one heteroatom chosen from sulfur, oxygen, nitrogen and fluorine. Such a nonsolvating polymer can be chosen from acrylonitrile homopolymers and copolymers, fluorovinylidene homopolymers and copolymers, and N-vinylpyrrolidone homopolymers and copolymers. In addition, the nonsolvating polymer can be a polymer carrying ionic substituents and in particular a polyperfluoroether sulfonate salt (such as an abovementioned Nafion®, for example) or a polystyrene sulfonate salt.

In another embodiment, the electrolyte of the battery of the present invention can be an inorganic conducting solid chosen from the compounds generally denoted by Lisicon, that is to say $Li_4XO_4$—$Li_3YO_4$ (X=Si or Ge or Ti; Y=P or As or V), $Li_4XO_4$—$Li_2AO_4$ (X=Si or Ge or Ti; A=Mo or S), $Li_4XO_4$—$LiZO_2$ (X=Si or Ge or Ti; Z=Al or Ga or Cr), $Li_4XO_4$—$Li_2BXO_4$ (X=Si or Ge or Ti; B=Ca or Zn), $LiO_2$—$GeO_2$—$P_2O_5$, $LiO_2$—$SiO_2$—$P_2O_5$, $LiO_2$—$B_2O_3$—$Li_2SO_4$, $LiF$—$Li_2S$—$P_2S_5$, $Li_2O$—$GeO_2$—$V_2O_5$ or $LiO_2$—$P_2O_5$—$PON$ solid solutions. A lithium battery comprising such an electrolyte operates within a very broad temperature range, of the order of −20° C. to 100° C.

Of course, the electrolyte of a battery of the present invention can additionally comprise the additives conventionally used in this type of material and in particular a plasticizer, a filler, other salts, and the like.

The negative electrode of the battery can be composed of lithium metal or a lithium alloy which can be chosen from the alloys β-LiAl, γ-LiAl, Li—Pb (for example $Li_7Pb_2$), Li—Cd—Pb, Li—Sn, Li—Sn—Cd, Li—Sn in various matrices, in particular oxygen-comprising matrices or metal matrices (for example Cu, Ni, Fe or Fe—C), or Li—Al—Mn.

In addition, the negative electrode of the battery can be composed of a composite material comprising a binder and a material capable of reversibly inserting lithium ions at low redox potential (hereinafter denoted by insertion material), said composite material being lithiated during a preliminary stage. The insertion material can be chosen from natural or synthetic carbonaceous materials. These carbonaceous materials can, for example, be a petroleum coke, a graphite, a graphite whisker, a carbon fiber, mesocarbon microbeads, a pitch coke or a needle coke. The insertion material can additionally be chosen from oxides, such as, for example, $Li_xMoO_2$, $Li_xWO_2$, $Li_xFe_2O_3$, $Li_4Ti_5O_{12}$ or $Li_xTiO_2$, or from sulfides, such as, for example, $Li_9Mo_6S_6$ and $LiTiS_2$, or from oxysulfides. Use may also be made of compounds which make it possible to reversibly store lithium at low potential, such as amorphous vanadates (for example $Li_xNiVO_4$), nitrides (for example $Li_{2.6-x}Co_{0.4}N$, $Li_{2+x}FeN_2$ or $Li_{7+x}MnN_4$), phosphides (for example $Li_{9-x}VP_4$), arsenides (for example $Li_{9-x}VAs_4$) and reversibly decomposable oxides (for example CoO, CuO or $Cu_2O$). The binder is an organic binder which is electrochemically stable in the range of operation of the negative electrode. Mention may be made, by way of examples, of poly(vinylidene fluoride) homopolymers or an ethylene/propylene/diene copolymer. A poly(polyvinylidene fluoride) is particularly preferred. A composite negative electrode can be prepared by introducing the carbonaceous compound into a solution of the binder in a polar aprotic solvent, by spreading the mixture obtained over a copper disk acting as collector and by then evaporating the solvent under hot conditions under a nitrogen atmosphere.

A battery according to the invention comprising a solid electrolyte can be provided in the form of a succession of layers composed respectively of the material of the positive electrode according to the invention and its current collector, the solid electrolyte, and the negative electrode and optionally its current collector.

A battery according to the invention comprising a liquid electrolyte can also be provided in the form of a succession of layers composed respectively of the material of the positive electrode according to the invention and its current collector, a separator impregnated by the liquid electrolyte, and the material constituting the negative electrode and optionally its current collector.

The present invention is illustrated in more detail by the examples given below, to which, however, it is not limited.

EXAMPLE 1

An aqueous solution of precursors was prepared by adding 6.8200 g (1.5M) of $\alpha$-$V_2O_5$ and 1.2589 g (1.2M) of $LiOH.H_2O$ to 25 ml of water under a nitrogen atmosphere. A gel G was formed after a maturing period of 15 hours. Subsequently, the gel was dried at 90° C. in the air for 15 days and then the xerogel thus obtained was subjected to a treatment at 350° C. under argon for 4 min. The product obtained is hereinafter denoted by XG-4.

EXAMPLE 2

Other samples were prepared according to the procedure of example 1 while modifying the drying time (DT) and/or the heat treatment time (HTT), as shown in table 1 below, in which the sample XG-4 from example 1 is mentioned for the record.

| Sample | | | | | | |
|---|---|---|---|---|---|---|
| XG-4 | XG-2 | XG-5 | XG-15a | XG-15b | XG-15c | XG-60 |
| DT | 15 d | 15 d | 15 d | 15 d | 3 d | 12 d | 15 d |
| HTT (min) | 4 | 2 | 5 | 15 | 15 | 15 | 60 |

EXAMPLE 3

1 g of $V_2O_5$ and 0.1689 g of LiOH were added to 15 ml of a 30% aqueous hydrogen peroxide solution. A gel was formed in a few minutes.

The gel obtained was subjected to drying at 90° C. in the air overnight and then to a heat treatment at 350° C. under argon for 15 min.

EXAMPLE 4

Other samples were prepared by repeating the procedure of example 1 but carrying out the first stage of the heat treatment for a time of 12 hours at 90° C. in the air and for different treatment times (HTT) at 350° C. as follow, in minutes: 1, 2, 3, 4, 5, 15, and 45.

FIG. 1 represents the X-ray diffraction diagram for the various samples obtained and for the initial sample before heat treatment at 350° C. It is thus confirmed that a heat treatment of 4 min at 350° C. is sufficient to clearly reveal the compound $Li_{1+\alpha}V_3O_8$ of the present invention, the line of which is labelled x in the diagram.

EXAMPLE 5

Measurement of the Performances

The electrochemical performances of various samples of oxide were tested in a Swagelok laboratory battery of the type: Li/liquid electrolyte (EC+DMC+$LiPF_6$)/(XG+carbon), operating at ambient temperature. For the positive electrode, carbon black was added to the sample of oxide XG.

A first series of measurements was carried out under cycling conditions corresponding to 2.5 Li per formula group per hour, on the one hand with the samples XG-2, XG-4, XG-15a, XG-15b and XG-60 according to the invention and, on the other hand, with a sample XG-0. This sample XG-0 was obtained according to the process of the example, without the heat treatment at 350° C.

A second series of measurements was carried out under cycling conditions corresponding to 0.4 Li per formula group per hour, on the one hand with the sample XG-15c according to the invention and, on the other hand, with a sample SG350. This sample SG350 was obtained under the conditions of the sample XG-15 but with a heat treatment at 350° C. for 10 h, preceded by a rise in temperature at the rate of 80° C./h.

Figure 2:
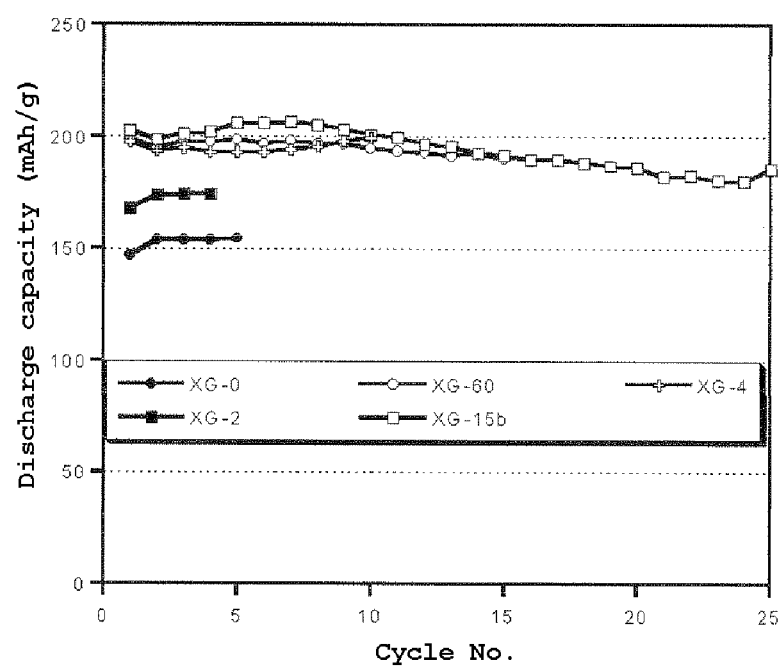
FIG. 2 represents the variation in the capacity as a function of the number of cycles for the first series.
Figure 3:
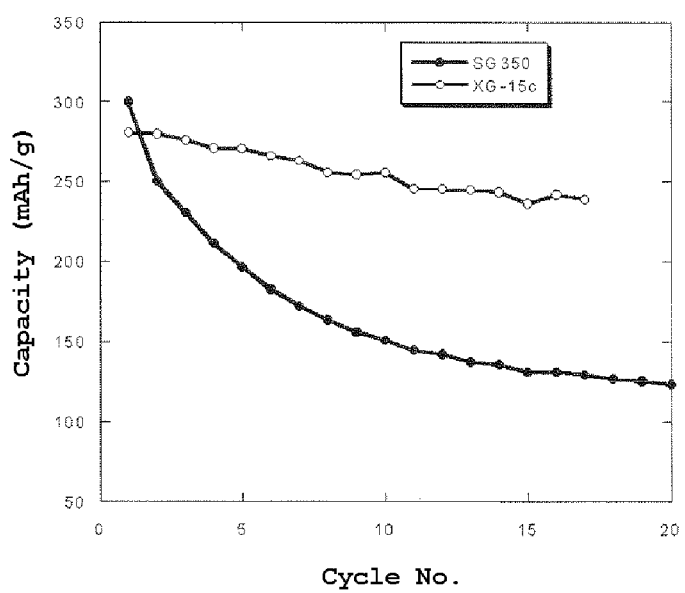
FIG. 3 represents the variation in the capacity as a function of the number of cycles for the second series.

FIGS. 2 and 3 represent the variation in the capacity as a function of the number of cycles for the first series and for the second series respectively.

It is thus apparent, from FIG. 2, that, for a cycling rate of 2.5 Li per hour per formula unit, the heat treatment time at 350° C. can be reduced down to 4 min without obtaining a significant loss in capacity during successive cycles.

FIG. 3 shows that, for a cycling rate of 0.4 Li per hour per formula unit, the heat treatment can be reduced from approximately ten hours to 15 min without significant loss in initial capacity and with a markedly improved retention in capacity during the cycles.

What is claimed is:

1. A composite positive electrode for a lithium battery, comprising a composite material which comprises lithium oxide $Li_{1+\alpha}V_3O_8$ (0.1≤α≤0.25) composed of agglomerates of small needles, said needles having a length (l) from 400 to 1000 nm, a width (w) such that 10<l/w<100 and a thickness (t) such that 10<l/t<100.

2. The composite positive electrode as claimed in claim 1, wherein the composite material additionally comprises:

a binder conferring mechanical strength,
a compound conferring electron conduction, and
optionally a compound conferring ionic conduction.

3. The composite positive electrode as claimed in claim 2, wherein:
the content of oxide $Li_{1+\alpha}V_3O_8$ is between 80 and 90% by weight;
the content of binder is less than 10% by weight;
the content of compound conferring electron conduction is between 5 and 15% by weight; and
the content of compound conferring ionic conduction is less than 5% by weight.

4. The electrode as claimed in claim 2, wherein the binder comprises a solvating polymer, a non-solvating polymer, or a mixture of solvating polymer and nonsolvating polymer.

5. The electrode as claimed in claim 4, wherein the binder additionally comprises a polar aprotic compound.

6. The electrode as claimed in claim 2, wherein the compound conferring ionic conduction is a lithium salt selected from the group consisting of $LiClO_4$, $LiPF_6$, $LiAsF_6$, $LiBF_4$, $LiR_FSO_3$, $LiCH_3SO_3$, lithium bisperfluoroalkylsulfonimides and lithium bis- and trisperfluorosulfonylmethides.

7. The electrode as claimed in claim 4, wherein the non-solvating polymer is selected from the group consisting of vinylidene fluoride homopolymers and copolymers; copolymers of ethylene, propylene, and diene; tetrafluoroethylene homopolymers and copolymers; N-vinylpyrrolidone homopolymers and copolymers; acrylonitrile homopolymers and copolymers; and methacrylonitrile homopolymers and copolymers.

8. The electrode as claimed in claim 7, wherein the non-solvating polymer is poly(vinylidene fluoride).

9. The electrode as claimed in claim 4, wherein the solvating polymer is selected from the group consisting of polyethers of linear, comb or block structure based on poly(ethylene oxide); copolymers comprising ethylene oxide or propylene oxide or allyl glycidyl ether unit; polyphosphazenes; crosslinked networks based on polyethylene glycol crosslinked by isocyanates; and copolymers of oxyethylene and of epichlorohydrin.

10. The electrode as claimed in claim 5, wherein the polar aprotic compound is selected from the group consisting of linear or cyclic carbonates; linear or cyclic ethers; linear or cyclic esters; linear or cyclic sulfones; sulfamides; and nitriles.

11. The electrode as claimed in claim 2, wherein the compound conferring electron conduction is selected from the group consisting of carbon blacks, graphites, carbon fibers, carbon nanowires and carbon nanotubes.

12. A positive electrode for a lithium battery comprising a composite material which comprises:
a binder conferring mechanical strength,
a compound conferring electron conduction,
optionally a compound conferring ionic conduction, and
lithium oxide $Li_{1+\alpha}V_3O_8$ ($0.1 \leq \alpha \leq 0.25$) obtained by a process comprising:
preparing a precursor gel and subjecting said gel to a heat treatment, wherein:
the precursor gel is prepared by bringing $\alpha$-$V_2O_5$ and a Li precursor into contact in a reaction medium in amounts such that the ratio of the $[V_2O_5]/[Li]$ concentrations is between 1.15 and 1.5; and
the heat treatment is carried out in two stages: a first stage under air at a temperature of between 80° C. and 150° C. for a time of 3 hours to 15 days and a second stage under a nitrogen or argon atmosphere at a temperature of between 250° C. and 350° C. for a time of between 4 min and 1 hour.

13. The electrode as claimed in claim 12, the lithium oxide $Li_{1+\alpha}V_3O_8$ ($0.1 \leq \alpha \leq 0.25$) is composed of agglomerates of small needles, said needles having a length (l) from 400 to 1000 nm, a width (w) such that $10<l/w<100$ and a thickness (t) such that $10<l/t<100$.

14. The electrode as claimed in claim 12, wherein:
the content of oxide $Li_{1+\alpha}V_3O_8$ is between 80 and 90% by weight;
the content of binder is less than 10% by weight;
the content of compound conferring electron conduction is between 5 and 15% by weight; and
the content of compound conferring ionic conduction is less than 5% by weight.

15. A battery comprising a negative electrode and a positive electrode separated by an electrolyte comprising a lithium salt in solution in a solvent or a lithium inorganic conducting solid, wherein the positive electrode is an electrode as claimed in claim 1.

16. The battery as claimed in claim 15, wherein the electrolyte comprises a lithium salt in solution and the lithium salt is selected from the group consisting of $LiClO_4$, $LiAsF_6$, $LiPF_6$, $LiBF_4$, $LiR_FSO_3$, $LiCH_3SO_3$, $LiN(R_FSO_2)_2$, $LiC(R_FSO_2)_3$ and $LiCF(R_FSO_2)_2$ wherein $R_F$ is a perfluoroalkyl group having from 1 to 8 carbon atoms.

17. The battery as claimed in claim 15, wherein the electrolyte comprises a lithium salt in solution and the solvent is selected from the group consisting of one or more polar aprotic compounds; a solvating polymer, a mixture of a polar aprotic compound and a solvating polymer; and a mixture of a polar aprotic compound, a solvating polymer, and a non-solvating polymer.

18. The battery as claimed in claim 15, wherein the electrolyte is an lithium inorganic conducting solid selected from the group consisting of $Li_4XO_4$—$Li_3YO_4$; $Li_4XO_4$—$Li_2AO_4$; $Li_4XO_4$—$LiZO_2$; and $Li_4XO_4$—$Li_2BXO_4$, wherein X is Si, Ge or Ti; Y is P, As, or V; A is Mo or S; Z is Al, Ga, or Cr; and B is Ca or Zn.

19. The battery as claimed in claim 15, wherein the electrolyte additionally comprises additives selected from the group consisting of plasticizer, filler, salts and mixtures thereof.

20. The battery as claimed in claim 15, wherein the negative electrode is a lithium metal, a lithium alloy, or a composite material.

* * * * *